May 28, 1929. P. MITCHELL 1,715,245
SAFETY DEVICE FOR ENGINE CYLINDERS
Filed May 26, 1927
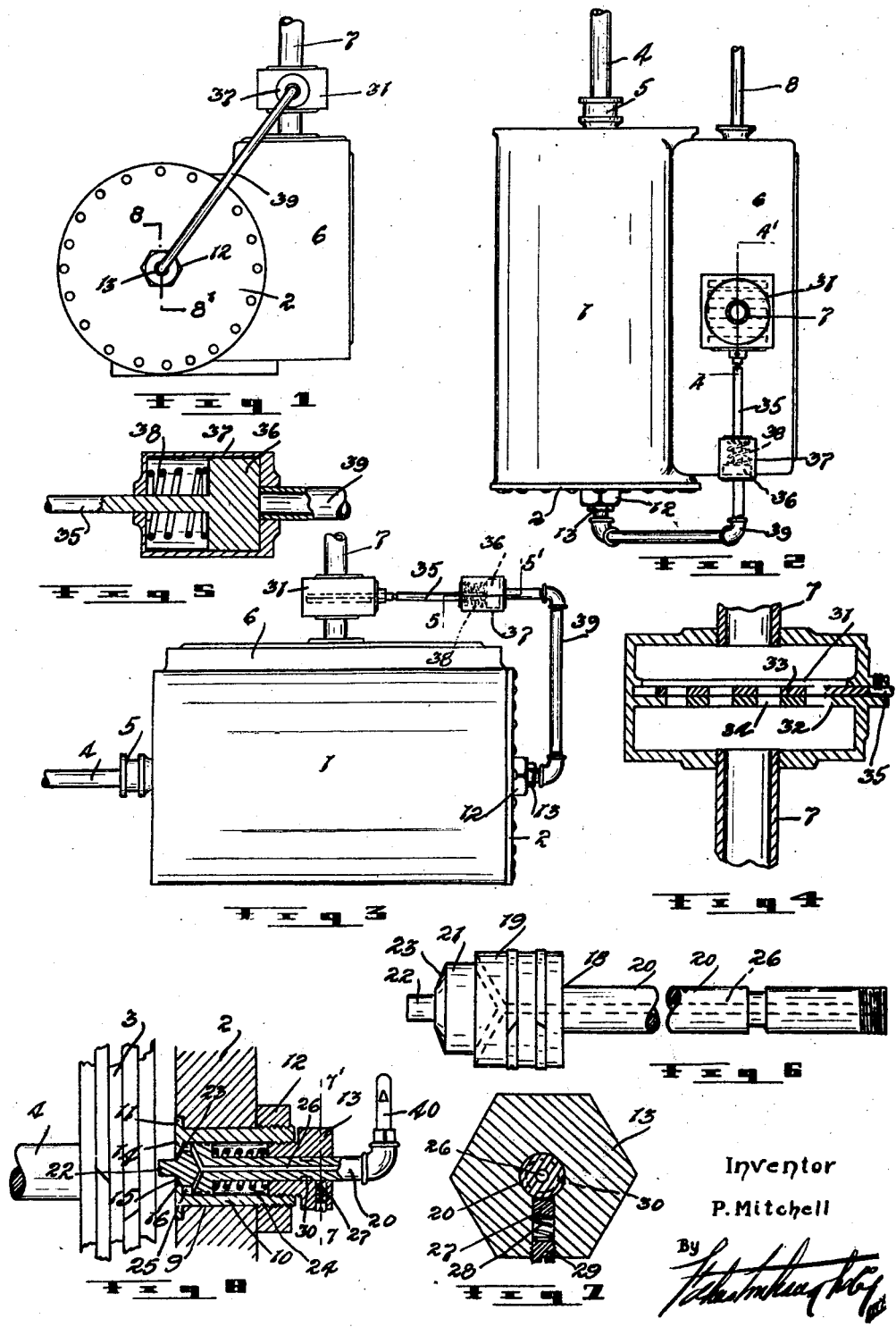
Inventor
P. Mitchell Patented May 28, 1929.

1,715,245

UNITED STATES PATENT OFFICE.

PETER MITCHELL, OF WINNIPEG, MANITOBA, CANADA.

SAFETY DEVICE FOR ENGINE CYLINDERS.

Application filed May 26, 1927. Serial No. 194,399.

The invention relates to improvements in safety devices for engine cylinders and an object of the invention is to provide a device which will prevent the reciprocating piston within the cylinder from knocking out or otherwise damaging the head of the cylinder in cases where through improper adjustment or otherwise, the travel of the piston is such that it might strike the cylinder head.

With the above more important object in view, the invention consists essentially in the arrangement and construction of parts hereinafter more particularly described, reference being had to the accompanying drawing, in which:—

Fig. 1 is an end view of a cylinder equipped with my invention.

Fig. 2 is a plan view of the same.

Fig. 3 is a side view.

Fig. 4 is an enlarged detailed vertical sectional view at 4—4′ Figure 2.

Fig. 5 is an enlarged detailed vertical sectional view at 5—5′ Figure 3.

Fig. 6 is an enlarged detailed side view of the safety valve.

Fig. 7 is an enlarged detailed vertical sectional view at 7—7′ Figure 8.

Fig. 8 is an enlarged detailed vertical sectional view at 8—8′ Figure 1 and showing a whistle attached to the safety valve.

In the drawing like characters of reference indicate corresponding parts in the several figures.

The cylinder 1 is of the conventional type having the forward end closed by the customary cylinder head 2 and contains the usual reciprocating piston 3 which carries the piston rod 4, the rod extending out through the usual stuffing box 5. The steam chest 6 through which the steam is admitted and exhausted from the cylinder is of usual form and the details are not herein shown or described. A live steam pipe 7 leads to the steam chest and the valve operating within the chest and not herein shown is controlled in its movement by the customary valve rod 8.

It is common in engines, owing to improper adjustment, for the piston 3 to travel too far and this results in the piston striking the head 2 and possibly damaging the same or breaking the head away from the cylinder and in order to prevent the cylinder or piston from being damaged, I have provided the safety device now described.

A hole 9 is bored preferably centrally in the end of the cylinder head 2 and in this hole, I insert a sleeve 10, the inner end of which is provided with an extending flange 11 countersunk in the inner face of the head. The outer end of the sleeve is externally screw threaded to receive a fastening nut 12 and it is also internally screw threaded to receive a bushing 13. The end of the sleeve towards the piston is closed by an end wall 14 and the end wall is provided with a central port 15 and a valve seat 16.

Within the sleeve I slidably mount a safety valve indicated generally by the reference numeral 18 and embodying a plunger 19 slidable within the sleeve, a stem 20 extending from the plunger, a head 21 of smaller diameter than the plunger and a stud 22 forming a striker extending from the head. The stud is adapted to pass through the opening 15 and the end of the head next the stud is provided with a cone face forming a valve 23 which is adapted to engage the valve seat 16. The stem extends slidably through the bushing 13 and between the head and the bushing and around the stem, I place a coiled spring 24 which is adapted to press the valve 23 against the seat.

It will be observed that an annular chamber 25 is reserved between the head and the wall 14 when the valve is seated. The stem 20 is provided with a longitudinally extending passage 26, the inner end of which branches and communicates with the annular chamber 25.

By observing Figure 8, it will be apparent that if through improper adjustment or otherwise, the pistons 3 have too long a travel, it will strike the stud 22 and in so doing unseat the valve. Here it will be observed that the stud 22 has a smaller diameter than that of the opening 16 with the result that when the stud is struck and out shifted, steam will pass from the cylinder into the chamber 25 and from the chamber, it can escape through the exhaust passage 26.

Means is provided for automatically locking the valve 23 in its unseated position, such being herein shown as a dog 27 slidably mounted in the bushing 13 and pressed continuously towards the stem 20 by a spring 28, the spring being retained by a screw plug 29.

The stem is provided with a circumscribing channel 30 and obviously when the stem is out shifted, the dog will enter the channel and so lock the valve 23 in its unseated position.

It is desirable under certain conditions, such as where engines are left running whilst unattended, that the safety valve provided operate to stop the engine and such is accomplished in the following manner.

In the steam pipe 7 leading to the steam chest, I locate a cut off valve which can be of any desired type and which is herein shown as a grid valve 31 which embodies a stationary grid 32 and a movable grid 33, the grids being arranged such that the openings 34 thereof are registering when steam is passing through the steam pipe to the steam chest. Obviously the lateral shifting of the movable grid will shut off the supply of steam to the chest. The movable grid is provided with an outwardly extending rod 35 which carries a piston 36 operating in a cylinder 37 and normally pressed against one end of the cylinder by a coiled spring 38, the spring acting normally to hold the openings 34 of the grids in registration.

A steam pipe 39 connects the outer end of the stem 20 with the cylinder 37 and the arrangement is such that when steam escapes from the cylinder 1 past the valve 23 and into the pipe 39, it will shift the piston 36 in a direction which will cause the grid valve to close, that is, the openings 34 of the grids 32 and 33 to pass out of registration. Accordingly the device will act to stop the engine upon the piston 3 striking the stud 22. If desired, the stem 35 can be locked in a position such that the grids will be held closed by a spring pressed dog associated with the stem 35 and a duplicate of that shown in Figure 7.

If there is an attendant looking after the engine, it is not so necessary that the engine be automatically stopped and accordingly I have shown in Figure 8, a modification of the invention wherein the appliances used for automatically shutting off the steam going to the engine are dispensed with and a whistle 40 has been substituted. The whistle is conencted directly to the outer end of the stem 20 and with this equipment when the piston 3 strikes the stud 22, the whistle will be operated and will continue to blow and the alarm so created will draw the attendant's attention and he will then naturally stop the engine in the usual manner.

What I claim as my invention is:—

1. The combination with a steam engine cylinder and a reciprocating piston therein, of a stationary sleeve passing through the cylinder head and provided at the inner end with an internal valve seat, a bushing mounted in the outer end of the sleeve, a plunger slidably mounted within the sleeve, a head extending from the plunger and having the free end thereof formed to provide a valve engageable with the seat, there being an annular chamber reserved around the head between the plunger and the seat, a striker carried by the head and extending freely through the valve opening and into the cylinder, a valve stem extending outwardly from the plunger and slidably through the bushing and provided with an internal passage communicating through the plunger with the annular chamber and a spring surrounding the stem and interposed between the plunger and the bushing and normally holding the valve seated.

2. The combination with a steam engine cylinder and a reciprocating piston therein, of a stationary sleeve passing through the cylinder head and provided at the inner end with an internal valve seat, a bushing mounted in the outer end of the sleeve a plunger slidably mounted within the sleeve, a head extending from the plunger and having the free end thereof formed to provide a valve engageable with the seat, there being an annular chamber reserved around the head between the plunger and the seat, a striker carried by the head and extending freely through the valve opening and into the cylinder, a valve stem extending outwardly from the plunger and slidably through the bushing and provided with an internal passage communicating through the plunger with the annular chamber, a spring surrounding the stem and interposed between the plunger and the bushing and normally holding the valve seated and a steam whistle mounted on the outer end of the stem and communicating with the passage therein.

Signed at Winnipeg, this 24th day of March, 1927.

PETER MITCHELL.